(12) United States Patent
Matsumura (10) Patent No.: US 8,115,464 B2
(45) Date of Patent: Feb. 14, 2012

(54) BOOST CIRCUIT AND POWER SUPPLY DEVICE

(75) Inventor: Yasuo Matsumura, Kyoto-Fu (JP)

(73) Assignee: Texas Instruments Incorporated, Dallas, TX (US)

( * ) Notice: Subject to any disclaimer, the term of this patent is extended or adjusted under 35 U.S.C. 154(b) by 296 days.

(21) Appl. No.: 12/487,390

(22) Filed: Jun. 18, 2009

(65) Prior Publication Data
US 2009/0309565 A1    Dec. 17, 2009

(30) Foreign Application Priority Data
May 22, 2008  (JP) .................... 2008-134646

(51) Int. Cl.
*G05F 1/56* (2006.01)
*G05F 1/565* (2006.01)
(52) U.S. Cl. ....................... 323/283; 323/241
(58) Field of Classification Search ......... 323/282–285, 323/237, 241
See application file for complete search history.

(56) References Cited

U.S. PATENT DOCUMENTS
5,912,552 A * 6/1999 Tateishi .................. 323/285
* cited by examiner

*Primary Examiner* — Adolf Berhane
*Assistant Examiner* — Nusrat Quddus
(74) *Attorney, Agent, or Firm* — John J. Patti; Wade J. Brady, III; Frederick J. Telecky, Jr.

(57) ABSTRACT

The objective of this invention is to provide a boost circuit that reduces power consumption and prevents malfunctioning when the input voltage becomes greater than a target voltage for the output voltage. Control circuit module 5 sets both control signals HCNT2 and LCNT2 to low level "L" when the conditions "output voltage VBoost is higher than voltage OVREF" and "voltage (VIN+VOFFSET) is higher than output voltage VBoost" are satisfied. With this, in boost circuit module 7, switch SWH will be off and switch SWL will be on to forcibly switch to mode B. In mode B, because switch SWH is on, output voltage VBoost will be near input voltage VIN, and the power consumption can be reduced.

7 Claims, 7 Drawing Sheets

FIG. 1

| VINdet | OVdet | HCNT2 | LCNT2 |
|---|---|---|---|
| H | H | L | L |
| H | L | HCNT1 | LCNT1 |
| L | H | H | L |
| L | L | HCNT1 | LCNT1 |

| VINdet | OVdet | HCNT2 | LCNT2 |
|--------|-------|-------|-------|
| H | H | H | L |
| H | L | HCNT1 | LCNT1 |
| L | H | L | L |
| L | L | HCNT1 | LCNT1 |

VOLTAGE RIPPLE ≠ VIN - VBSET
MAXIMUM VOLTAGE RIPPLE ≠ VHon
(VIN ≠ VBoost + VHon)

(PRIOR ART)

BOOST CIRCUIT AND POWER SUPPLY DEVICE

FIELD OF THE INVENTION

The present invention relates to a boost circuit and a power supply device provided with switching elements.

BACKGROUND OF THE INVENTION

From an environmental point of view, a greater demand for reduced energy has arisen in recent years. In electronic devices, such as portable phones and digital cameras, reducing power consumption is a requisite for extending battery usage time.

From such a point of view, power supply devices have used switching regulators that provide higher efficiency and enable miniaturization. Synchronous rectification boosting PFM-controlled type power supply devices are known as switching regulators with which high efficiency can be achieved at light loads.

Figure 8:
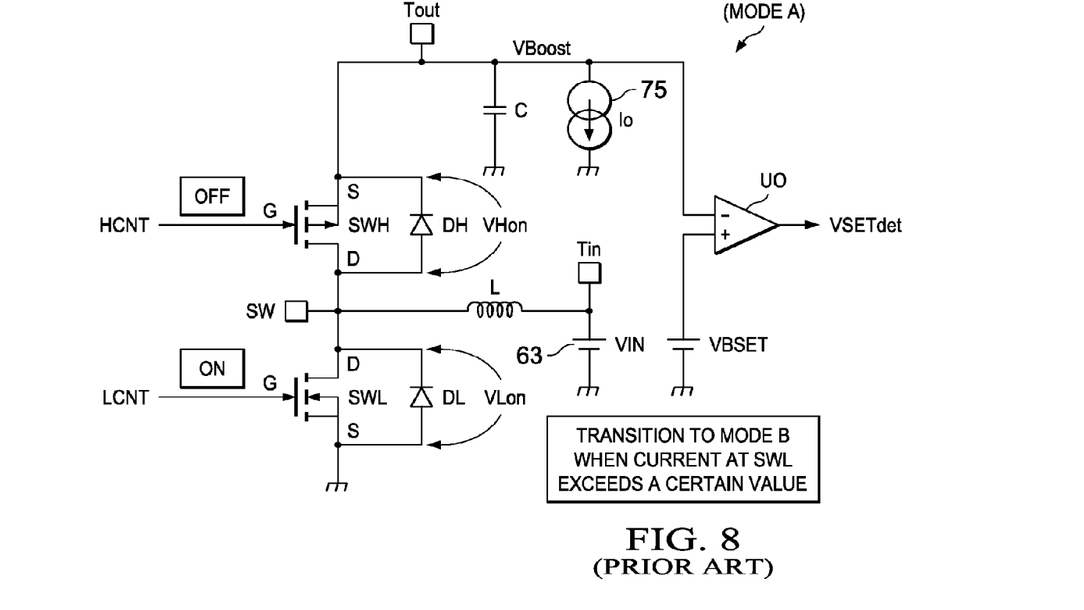
FIG. 8 is a figure for explaining mode A in a conventional power supply device.
Figure 9:
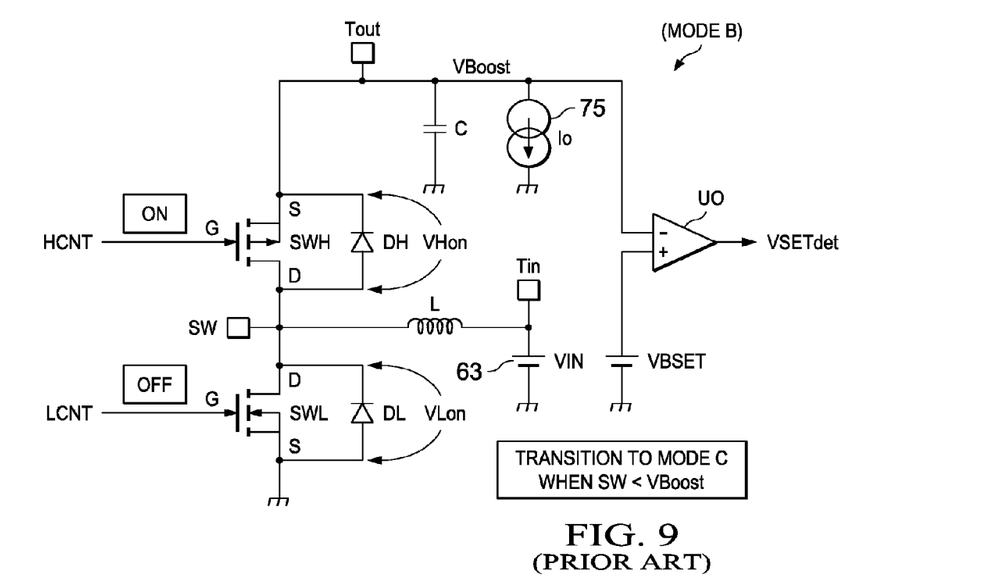
FIG. 9 is a figure for explaining mode B in a conventional power supply device.
Figure 10:
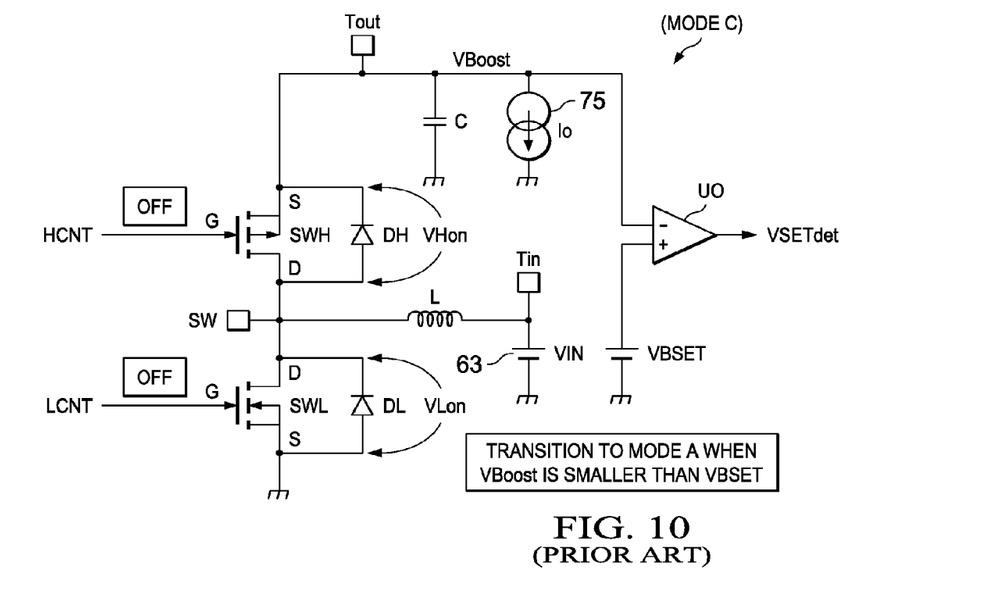
FIG. 10 is a figure for explaining mode C in a conventional power supply device.

Synchronous rectification boosting PFM-controlled type power supply devices operate by transitioning successively to three modes A, B and C as shown in FIGS. 8 to 10, for example.

The power supply device has an input side terminal Tin, an inductor L, a switch SWL (NMOS transistor), a switch SWH (PMOS transistor), an output side capacitor C, an output side terminal Tout, and a comparator UO.

Here, comparator UO compares output voltage VBoost and target voltage VBSET.

The power supply device generates control signals HCNT and LCNT that respectively turn switches SWH and SWL on and off, respectively, based on the comparison result by comparator UO.

However, because switches SWL and SWH are MOSFETs, parasitic diodes DL and DH are respectively present.

The power supply device successively switches between modes A, B and C as shown below.

Mode A

In mode A, as shown in FIG. 8, switch SWL is on, and switch SWH is off in accordance with control signals HCNT and LCNT.

Current flows from input side terminal Tin through inductor L and between D (drain)—S (source) of switch SWL to ground. Energy is stored in inductor L by this. Then, when the current flowing to switch SWL exceeds a certain value, the target energy is determined to have been stored in inductor L, and control signals HCNT and LCNT are switched to transition to mode B.

Mode B

In mode B, as shown in FIG. 9, switch SWH is on, and switch SWL is off in accordance with control signals HCNT and LCNT.

Current flows to the output side according to the energy stored in inductor L, and output voltage VBoost is boosted by this.

Then, when the energy stored in inductor L is exhausted and the voltage at terminal SW falls below output voltage VBoost, reverse current flow from the output voltage VBoost side to input side terminal Tin starts. The power supply device switches control signals HCNT and LCNT to transition to mode C when the reverse current flow is sensed.

Mode C

In mode C, as shown in FIG. 10, switch SWH is off and switch SWL is off, in accordance with control signals HCNT and LCNT.

Output side capacitor C is discharged by load Io connected to output side terminal Tout, and output voltage VBoost falls because of this.

Then, output voltage VBoost falls below target voltage VBSET, and output VSETdet of comparator UO is switched from low level to high level.

The power supply device switches control signals HCNT and LCNT to transition to mode A when switching of output VSETdet to high level is sensed.

Figure 11:
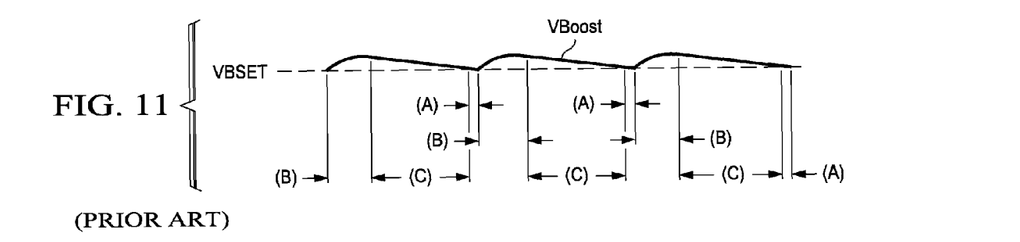
FIG. 11 is a figure for explaining output voltage VBoost in each mode with the power supply device shown in FIGS. 8-10.

In this way, output voltage VBoost is boosted to an approximately constant value, as shown in FIG. 11, by repetition of the transition between modes A/B/C described above by the power supply device.

However, with the power supply device described above, a problem exists as below under conditions where input voltage VIN is higher than the target voltage VBSET for output voltage VBoost.

(Problem 1: VIN>Vbset+VHon)

When input voltage VIN is higher than a voltage in which diode voltage VHon of parasitic diode DH is added to target voltage VBSET for output voltage VBoost, because parasitic diode DH is always on, output voltage VBoost cannot be lower than target voltage VBSET.

For this reason, in mode C described above, the condition that "voltage VBoost falls below target voltage VBSET" cannot be satisfied, and transition to modes A and B will not occur.

In this case, output voltage VBoost falls only by the amount of diode voltage VHon of diode DH from input voltage VIN. The problem is that, in this state, the power supply device will always lose power that is voltage VHon multiplied by load current Io, and the power consumption will be high.

(Problem 2: VBoost+VHon≧VIN≧VBSET)

Figure 12:
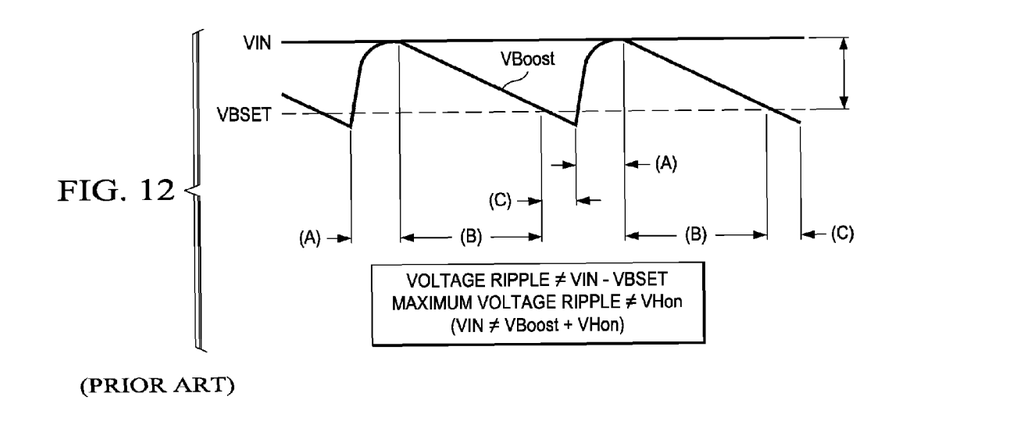
FIG. 12 is a figure for explaining problems with the power supply device shown in FIGS. 8-10.

As shown in FIG. 12, when input voltage VIN is higher than target voltage VBSET for voltage VBoost and lower than the voltage of diode voltage VHon of parasitic diode DH added to voltage VBoost, transitioning successively to modes A, B and C will occur.

In this case, in mode B, output voltage VBoost rises to a voltage approximately identical to voltage VIN, and transition to mode C occurs. After the transition to mode C, output voltage VBoost falls to target voltage VBSET for voltage VBoost from near input voltage VIN because of the discharge of capacitor C. Then, when comparator UO senses that output voltage VBoost has fallen below target voltage VBSET, control to transition to mode A is provided.

In this way, a voltage ripple occurs in output voltage VBoost approximately equal to a voltage width with input voltage VIN as the upper limit and target voltage VBSET for output voltage VBoost as the lower limit. The closer input voltage VIN is to the voltage (VBoost+VHon), the greater the voltage ripple becomes, and at its maximum, is a voltage approximately equal to diode voltage VHon.

Generally, the voltage ripple in the power supply device will be 600-700 mV, which is a large value. Such a large voltage ripple is undesirable for circuitry using output voltage VBoost as the source voltage.

And depending on the power supply device construction, malfunctioning of the circuitry because of the voltage ripple is also a concern.

The present invention was devised in consideration of this situation. Its objective is to provide a boost circuit and power supply device that reduces power consumption and prevents malfunctioning when the input voltage is higher than the target voltage for the output voltage.

SUMMARY OF THE INVENTION

In order to solve the problems with the prior art described above and to achieve the objective described above, the boost circuit of the present invention has an input terminal and an output terminal, a boost converter that boosts voltage input to the input terminal and outputs the boosted voltage from the output terminal, and a controller that controls the boost converter so that the boost operation by the boost converter is stopped to provide a conducting state between the input terminal and the output terminal when the input voltage at the input terminal is higher than a prescribed voltage specified according to the target voltage for the output voltage at the output terminal.

Ideally, the boost converter in the boost circuit of the present invention has an inductor, a capacitor, a first switching element that turns the path through which current flows from the input terminal to the inductor on and off, and a second switching element that turns the path through which current flows from the inductor to the capacitor on and off. The control means controls such that the boost converter transitions successively to a first mode in which the first switching element is turned on and the second switching element is turned off, and energy is stored in the inductor; a second mode in which the first switching element is turned off and the second switching element is turned on, and energy stored in the inductor is released to the capacitor, and a third mode in which the first switching element and the second switching element are both turned off and a non-conducting state is produced between the input terminal and the output terminal. When the input voltage is higher than the output voltage, and when the output voltage is higher than a prescribed reference value, the boost converter is forcibly caused to transition to the third mode.

Ideally, the reference voltage in the boost circuit of the present invention is a higher voltage than the target voltage for the output voltage.

Ideally, the control means in the boost circuit of the present invention causes the boost converter to transition from the second mode to the third mode according to the polarity of the current flowing to the second switching element.

Ideally, the control means in the boost circuit of the present invention causes the boost converter to transition to the second mode when the current flowing to the first switching terminal in the first mode exceeds a certain value.

Ideally, the control means in the boost circuit of the present invention causes the boost converter to transition to the first mode when the output voltage falls below the target voltage in the third mode.

The power supply device of the present invention has a battery, an input terminal to which voltage from the battery is input, an output terminal, a boost converter that boosts the input voltage from the battery and outputs it from the output terminal, and a control means that controls the boost converter so that the boost operation by the boost converter is stopped to provide a conducting state between the input terminal and the output terminal when the input voltage at the input terminal is higher than a prescribed voltage specified according to the target voltage for the output voltage at the output terminal.

With the present invention, a boost circuit and a power supply device can be provided that reduce power consumption and prevent malfunctioning when the input voltage is higher than the target value for the output voltage.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

A power supply device pertaining to the present invention is explained below referencing figures.

Figure 1:
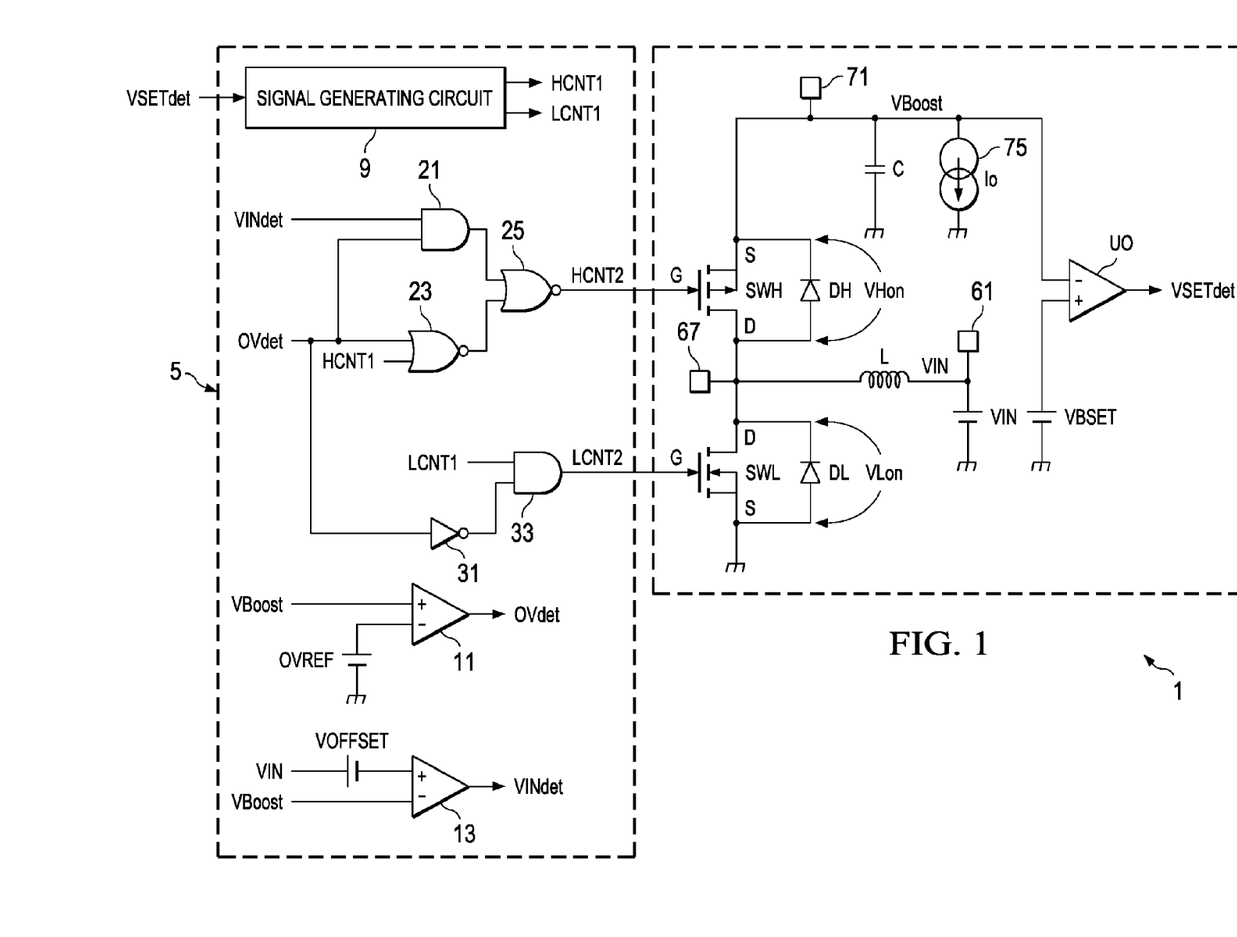
FIG. 1 is a block diagram of a power supply device pertaining to an embodiment of the present invention.

FIG. 1 is a block diagram of a power supply device 1 pertaining to an embodiment of the present invention.

As shown in FIG. 1, power supply device 1 is a synchronous rectification boosting PFM-controlled type power supply device that has a control circuit module 5 and a boost circuit module 7, for example, In power supply device 1, control circuit module 5 generates control signals HCNT2 and LCNT2 that are applied to the gates (G) of switches SWH and SWL in boost circuit module 7 so that boost circuit module 7 will transition appropriately between modes A, B and C for boost operation, based on the status of boost circuit module 7. The path between the drain and source in switches SWH and SWL is turned on or off by control signals HCNT2 and LCNT2 that are applied to their respective gates (G).

Control circuit module 5 sets both control signals HCNT2 and LCNT2 on low level "L" when the conditions "output voltage VBoost is higher than voltage OVREF" and "Voltage (VIN+VOFFSET) is higher than output voltage VBoost" are satisfied, that is, in situations where (Problem 1) and (Problem 2) explained with the prior art occur. Switch SWL will be off and switch SWH will be on in boost circuit module 7 to be forcibly switched to mode B by this.

Since switch SWH is on when boost circuit module 7 is in state B, output voltage VBoost moves toward input voltage VIN, and the power loss can be reduced.

Boost circuit module 7 will maintain mode B while the conditions above are satisfied, so output voltage VBoost is held at a constant voltage near input voltage VIN, and voltage ripple can be suppressed.

Control circuit module 5 and boost circuit module 7 will be explained in detail below.

Control Circuit Module 5

As shown in FIG. 1, control circuit module 5 has, for example, a signal generating circuit 9, a comparator 11, a comparator 13, an AND circuit 21, a NOR circuit 23, a NOR circuit 25, a NOT circuit 31, and an AND circuit 33.

Here, control circuit module 5 is an example of the control means of the present invention. Mode A is an example of the first mode of the present invention, mode B is an example of the second mode of the present invention, and mode C is an example of the third mode of the present invention.

Signal generating circuit 9 generates control signals HCNT1 and LCNT1 to switch boost circuit module 7 to modes A, B and C.

Signal generating circuit 9 sets control signal HCNT1 to low level (L) and control signal LCNT1 to low level (L) to transition to mode B when current above a certain value is flowing between the source and drain of switch SWL in boost circuit module 7 in mode A.

Here, whether current above a certain value is flowing between the source (S) and drain (D) of switch SWL is determined based on the peak value or the mean value of said current, for example.

Signal generating circuit 9 sets control signal HCNT1 to high level and LCNT1 to low level to transition to mode C when current flows from the source (S) of switch SWH to the drain (D) in mode B (when the polarity of the current changes), that is, when the voltage at terminal 67 at one end of inductor L falls below voltage VBoost at output side terminal 71.

Here, whether the voltage at terminal 67 at one end of inductor L is lower than output voltage VBoost at output side terminal 71 is determined by signal generating circuit 9 based on output from a comparison circuit that compares the voltage at terminal 67 and output voltage VBoost.

Signal generating circuit 9 sets control signal HCNT1 to high level and LCNT1 to high level to transition to mode A when the voltage for output voltage VBoost at output side terminal 71 falls below target value VBSET for VBoost in mode C.

Here, whether the voltage for output voltage VBoost at output side terminal 71 is lower than target voltage VBSET for VBoost is determined by signal generating circuit 9 based on output VSETdet from comparator UO.

Voltage VBoost at output side terminal 71 is input to the + terminal of comparator 11, and voltage OVREF is applied to the − terminal.

Here, voltage OVREF is higher than target voltage VBSET. Note that target voltage VBSET is the reference voltage that is compared with output voltage VBoost at output side terminal 71 in order to determine the timing for switching to mode A, in mode C. In concrete terms, control is provided to switch from mode C to mode A when voltage VBoost falls below target voltage VBSET.

Output OVdet from comparator 11 will be high level (H) when output voltage VBoost is higher than voltage OVREF, and will be low level (L) when it is not.

Output VINdet from comparator 13 is used as a condition for forcibly switching boost circuit module 7 to mode B.

A condition based on output OVdet is used to prevent forcible holding in mode B after mode A when power supply device 1 starts up.

Voltage OVREF, which is higher than target voltage VBSET, is used to prevent unstable operation due to the effects of noise or the like superimposed on voltage VBoost.

A voltage that consists of VOFFSET added to input voltage VIN at input side terminal 61 is applied to the + terminal of comparator 13, and output voltage VBoost at output side terminal 71 is applied to the − terminal.

Output VINdet from comparator 13 will be at high level when voltage (VIN+VOFFSET) is higher than voltage VBoost, and will be at low level when it is not.

Output VINdet from comparator 13 is used as a condition for forcibly switching boost circuit module 7 to mode B.

The conditions depending on output VINdet are satisfied in a situation where normal boost operation should not be performed, such as when (Problem 1) and (Problem 2) explained with the prior art occur, namely, input voltage VIN is higher than output voltage VBoost.

Voltage (VIN+VOFFSET), which is higher than input voltage VIN, is used to prevent unstable operation due to the effects of noise or the like.

AND circuit 21 outputs the logical product of output OVdet from comparator 11 and output VINdet from comparator 13 to NOR circuit 25.

NOR circuit 23 outputs the negative logical sum of output OVdet of comparator 11 and control signal HCNT1 from signal generating circuit 9 to NOR circuit 25.

NOR circuit 25 outputs the negative logical sum of the outputs of AND circuit 21 and NOR circuit 23 to the gate of switch SWH as control signal HCNT2.

NOT circuit 31 inverts output OVdet from comparator 11 and outputs it to AND circuit 33.

AND circuit 33 outputs the logical product of control signal LCNT1 from signal generating circuit 9 and the output from NOT circuit 31 to the gate of switch SWL as control signal LCNT2.

Figure 2:
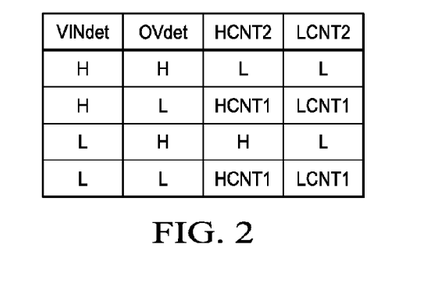
FIG. 2 is a figure for explaining the relationship between outputs VINdet and OVdet, and control signals HCNT2 and LCNT2.

Here, the relationship between outputs VINdet and OVdet, and control signals HCNT2 and LCNT2 is as shown in FIG. 2.

As shown in FIG. 2, when both outputs VINdet and OVdet are high level (H), that is, when both conditions "voltage VBoost" is higher than voltage OVREF" and "Voltage (VIN+VOFFSET) is higher than voltage VBOOST" are satisfied, both control signals HCNT2 and LCNT2 will be low level "L." Switch SWL will be off, switch SWH will be on, and forcible switching to mode B by this will occur.

On the other hand, as shown in FIG. 2, when "output VINdet is high level and OVDET is low level," or when "output VINdet is low level and OVdet is low level," control signals HCNT2 and LCNT2 will be the same as control signals HCNT1 and LCNT1, respectively.

Also as shown in FIG. 2, when "output VINdet is low level and OVdet is high level," control signal HCNT2 will be high level, and control signal LCNT2 will be low level. In this case, switches SWH and SWL will both be off, which gives mode C.

Boost Circuit Module 7

Boost circuit module 7, for example, has a switch SWH, a switch SWL, a parasitic diode DH, a parasitic diode DL, an input side terminal 61, an inductor L, and output side terminal 71, and output side capacitor C, and a comparator UO.

Boost circuit module 7 is an example of the boost converter of the present invention. Input side terminal 61 is an example of the input terminal of the present invention, and output side terminal 71 is an example of the output terminal of the present invention.

Inductor L is an example of the inductor of the present invention, output side capacitor C is an example of the capacitor of the present invention, switch SWL is an example of the first switching element of the present invention, and switch SWH is an example of the second switching element of the present invention.

Source (S) of switch SWH is connected to output side terminal 71, output side capacitor C, load 75 and one terminal of comparator UO.

Here, output side capacitor C stores charge according to current that comes in through switch SWH from inductor L in mode B. Output voltage VBoost is determined according to the stored charge in output side capacitor C.

Load 75 is a circuit to which power is supplied by output voltage VBoost after boosting.

Drain (D) of switch SWH is connected to one end of inductor L, to terminal 67, and to drain (D) of switch SWL.

Between source (S) and drain (D) of switch SWH, parasitic diode DH is present in parallel with them such that from drain (D) to source (S) is the forward direction.

Control signal HCNT2 from NOR circuit 25 of control circuit module 5 is applied to gate (G) of switch SWH.

Switch SWH is a p-channel MOS transistor. When control signal HCNT2 applied to gate (G) is low level (L), between drain (D) and source (S) will be on, and when control signal HCNT2 is high level (H), the path between drain (D) and source (S) will be off.

Drain (D) of switch SWL is connected to drain (D) of switch SWH, terminal 67, and inductor L.

Source (S) of switch SWL is connected to the ground.

Between source (S) and drain (D) of switch SWL, parasitic diode DH is present in parallel with them such that from source (S) to drain (D) is the forward direction.

Control signal LCNT2 from NOR circuit 33 of control circuit module 5 is applied to gate (G) of switch SWL.

Switch SWL is an n-channel MOS transistor. When control signal LCNT2 applied to gate (G) is high level (H), the path between drain (D) and source (S) will be on, and when control signal LCNT2 is low level (L), the path between drain (D) and source (S) will be off.

Terminal 67 and one end of inductor L are connected to the contact point of drain (D) of switch SWH and drain (D) of switch SWL.

The other end of inductor L is connected to input terminal 61, and voltage VIN is applied.

A battery that supplies input voltage VIN is connected to input terminal 61.

Current flows from input side terminal 61 through switch SWL to inductor L and energy is stored in mode A (when switch SWH is off, and switch SWL is on). Current flows from inductor L through switch SWH to capacitor C in mode B (when switch SWH is on, and switch SWL is off) according to the energy stored in inductor L. Charge is stored in output side capacitor C, and output voltage VBoost at output side terminal 71 rises because of this.

Source (S) of switch SWH, output side terminal 71, output side capacitor C and load 75 are connected to the − terminal of comparator UO.

VBSET, which is the target voltage for VBoost, is applied to the + terminal of comparator UO.

Signal VSETdet output from comparator UO is switched from low level (L) to high level (H) when output voltage VBoost at output side terminal 71 falls below target voltage VBSET.

Signal VSETdet is output from comparator UO to signal generating circuit 9 of control circuit module 5.

Operating examples for power supply device 1 shown in FIG. 1 are explained below.

FIRST OPERATING EXAMPLE

In this operating example, in state C, an operating example for power supply device 1 is explained for the case in which VIN rises above the voltage of diode voltage VHon of parasitic diode DH added to target voltage VBSET for output voltage VBoost, that is, when (Problem 1) described above in the prior art occurs.

In this case, when parasitic diode DH comes on, the condition that "output voltage VBoost is smaller than target voltage VBSET," which is the condition for transitioning from mode C to mode A, is not satisfied. Namely, output voltage VBoost is larger than target voltage VBSET.

However, when the condition that output voltage VBoost is higher than voltage OVREF (>VBSET) is satisfied, output OVdet from comparator 11 will be high level (H).

On the other hand, when voltage "VIN+VOFFSET" is higher than output voltage VBoost, output VINdet from comparator 13 will be high level (H).

Thus, control signals HCNT2 and LCNT2 will be low level (L), and switch SWH is on and switch SWL is off, that is, switching to mode B occurs.

Such switching to mode B is carried out forcibly regardless of control signals HCNT1 and LCNT1 generated by signal generating circuit 9.

Figure 3:
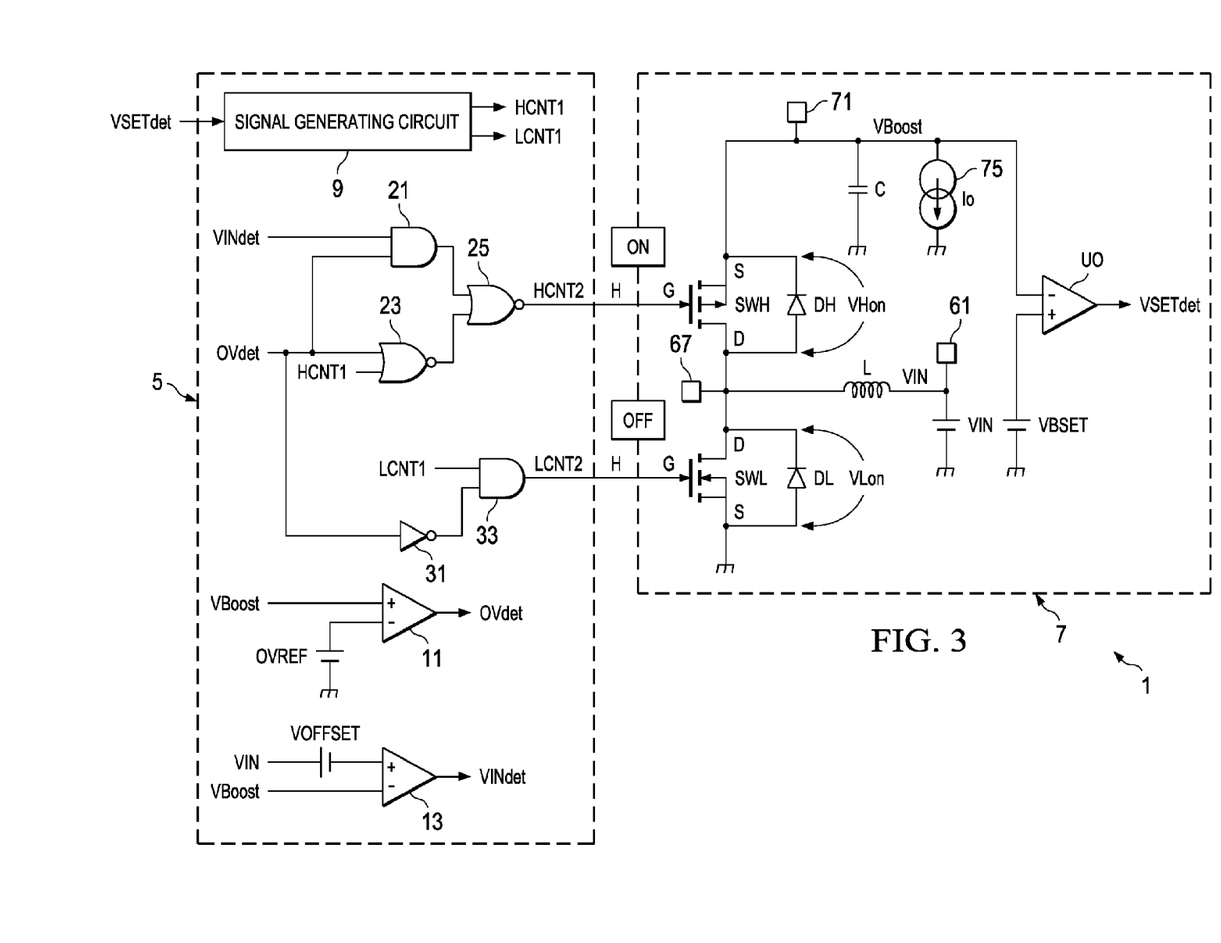
FIG. 3 is a figure for explaining the circuit status when the power supply device shown in FIG. 1 is in mode B.

By going to mode B in this way, input side terminal 61 and output side terminal 71 are in a conducting state through switch SWH and inductor L, and input voltage VIN and output voltage VBoost will be approximately equal.

Figure 4:
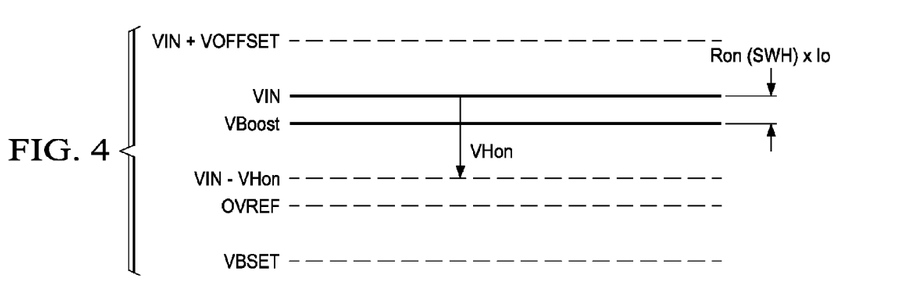
FIG. 4 is a figure for explaining power consumption in a first operating example for the power supply device shown in FIG. 1.

In this case, as shown in FIG. 4, the power loss will be current Io multiplied by voltage V (SWH) according to the resistance portion Ron (SWH) between drain (D) and source (S) of switch SWH.

Here, because voltage V (SWH) is significantly smaller than diode voltage VHon, the power loss can be reduced significantly as compared with the prior art.

SECOND OPERATING EXAMPLE

In this operating example, an operating example for power supply device 1 is explained for the case in which input voltage VIN is higher than target voltage VBSET for output voltage VBoost, and lower than the voltage of diode voltage VHon of parasitic diode DH added to output voltage VBoost, that is, when (Problem 2) described above in the prior art occurs.

Figure 5:
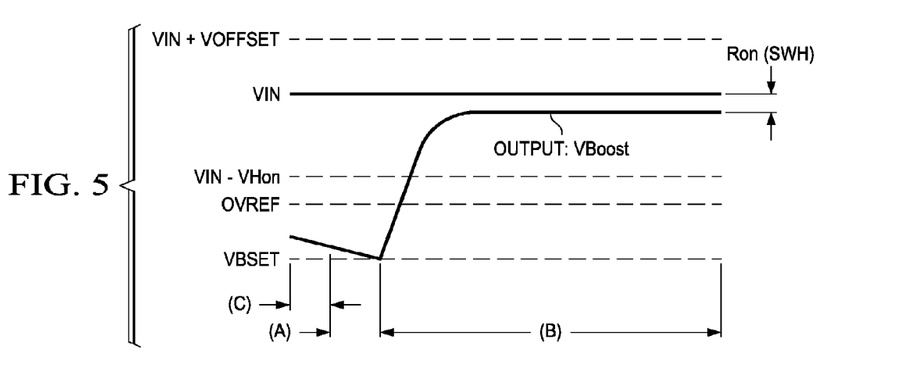
FIG. 5 is a figure for explaining output voltage VBoost in a second operating example for the power supply device shown in FIG. 1.

Namely, with power supply device 1, as shown in FIG. 5, output voltage VBoost being lower than voltage OVREF and output OVdet being low level (L) in mode A are shown. Thus, as shown in FIG. 2, control signal HCNT2 and LCNT2 agree with control signals HCNT1 and LCNT1, respectively.

On the other hand, as a prerequisite of this operating example, voltage "VIN+VOFFSET" is greater than output voltage VBoost, and output VINdet from comparator 13 is high level (H).

Then, when the current flowing between drain (D) and source (S) of switch SWL exceeds a certain value, signal generating circuit 9 sets control signals HCNT1 and LCNT1 to low level (L), and control signals HCNT2 and LCNT2 will be low level (L).

With this, switch SWH will be on, switch SWL will be off, and boost circuit module 7 switches to mode B.

With switching to mode B, current flows from inductor L through switch SWH, and voltage VBoost rises.

Then voltage VBoost will be greater than voltage OVREF, and output OVdet switches to high level (H).

Thus, boost circuit module 7 forcibly maintains mode B, and switch SWH is on, so voltage VBoost rises close to voltage VIN, and this state is maintained.

Thus, the waveform of voltage VBoost will be as shown in FIG. 5, and the voltage ripple of the past as shown in FIG. 12 can be suppressed.

THIRD OPERATING EXAMPLE

With this operating example, a case in which a normal boost operation is performed will be explained.

In this case, voltage "VIN+VOFFSET" is lower than voltage VBoost, and output VINdet from comparator 13 is low level (L).

Thus, as shown in FIG. 2, control signals HCNT2 and LCNT2 agree with control signals HCNT1 and LCNT1, respectively.

Therefore, power supply device 1, as shown below, switches successively through modes A, B and C.

(Mode A)

In mode A, switch SWH will be off, and switch SWL will be on according to control signals HCNT2 and LCNT2 shown in FIG. 1.

Current flows from input side terminal 61 through inductor L and between D (drain) and S (source) of switch SWL to ground. Thus, energy is stored in inductor L. Then, when the current flowing to switch SWL exceeds a certain value, the target energy is determined to have been stored in inductor L, and control signals HCNT2 and LCNT2 are switched to transition to mode B.

(Mode B)

In mode B, switch SWH will be on and switch SWL will be off, according to control signals HCNT2 and LCNT2.

Thus, current flows to the output side, and output voltage VBoost rises according to the energy stored in inductor L.

Then, when the energy stored in inductor L is exhausted and the voltage at terminal 67 falls below output voltage VBoost, reverse current flow from the output voltage VBoost side to the input terminal 61 side starts. Signal generating circuit 9 switches control signals HCNT2 and LCNT2 to transition to mode C when the reverse current flow is sensed.

(Mode C)

In mode C, switch SWH will be off, and switch SWL will be on according to control signals HCNT2 and LCNT2.

With this, output side capacitor C is discharged by load Io connected to the output side, and output voltage VBoost falls.

Then, output voltage VBoost falls below target voltage VBSET, and output VSETdet from comparator UO switches from low level to high level.

Signal generating circuit 9 switches control signals HCNT2 and LCNT2 to transition to mode A when the fact that output VSETdet has switched to high level is sensed.

In this way, with power supply device 1, output voltage VBoost is (voltage) boosted to be constant, as shown in FIG. 11, by repeating the transition between modes A/B/C.

As explained above, with power supply device 1, when the conditions that "output voltage VBoost is higher than voltage OVREF" and "voltage (VIN+VOFFSET) is higher than output voltage VBoost" are satisfied, that is, when (Problem 1) and (Problem 2) explained with the prior art occur, both controls signals HCNT2 and LCNT2 are set to low level "L." Thus, in boost circuit module 7, switch SWH will be on, switch SWL will be off, and forcible switching to mode B occurs.

Boost circuit module 7 in mode B can achieve a smaller power loss, as compared with when current flows forward to parasitic diode DH, since switch SWH is on.

Boost circuit module 7 also maintains mode B while the conditions are satisfied, so output voltage VBoost is held at a constant voltage close to input voltage VIN, and voltage ripple can be suppressed.

Also with power supply device 1, a normal boost operation can be suitably accomplished in the same way as with a conventional power supply device.

A variation of power supply device 1 described above is explained below.

Figure 6:
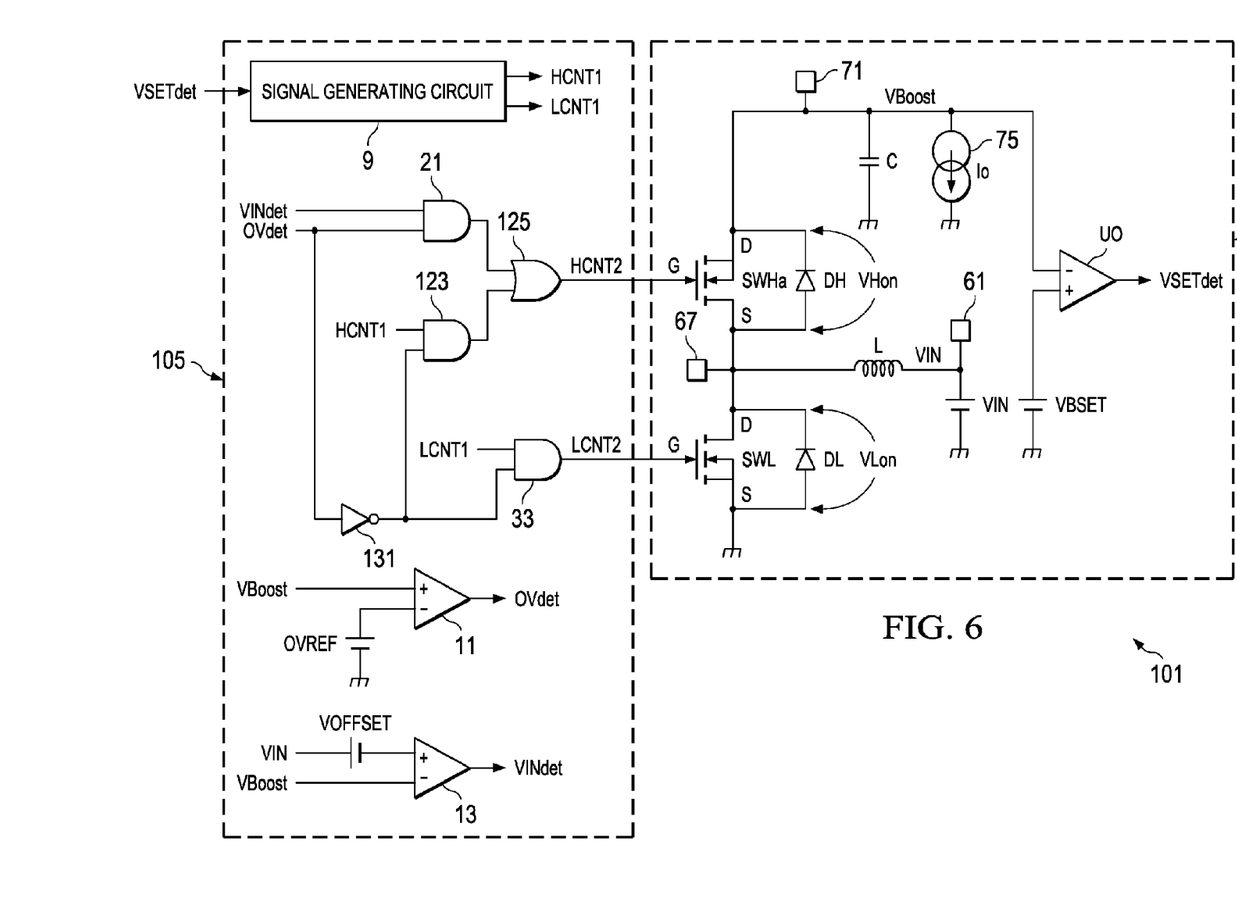
FIG. 6 is a block diagram of a power supply device pertaining to another embodiment of the present invention.

FIG. 6 is a block diagram of a power supply device 101 pertaining to another embodiment of the present invention.

As shown in FIG. 6, the logic circuit in control circuit module 105 and part of boost circuit module 107 in power supply device 101 differ from power supply device 1.

Only the differences will be explained below.

In boost circuit module 107 of power supply device 101, switch SWHa is an n-channel MOS transistor.

Control circuit module 105 of power supply device 101 also has, for example, AND circuit 21, AND circuit 123, OR circuit 125, NOT circuit 131, and AND circuit 33, in addition to signal generating circuit 9, comparator 11 and comparator 13.

AND circuit 21 outputs the logical product of output VINdet from comparators 11 and 13 and output VINdet from comparator 13 to OR circuit 125.

NOT circuit 131 inverts output OVdet from comparators 11 and outputs the result to AND circuits 33 and 123.

AND circuit 123 outputs the logical product of control signal HCNT1 from signal generating circuit 9 and the output from NOT circuit 131 to OR circuit 125.

OR circuit 125 outputs the logical sum of the outputs of AND circuit 21 and AND circuit 123 to the gate of switch SWH as control signal HCNT2.

AND circuit 33 outputs the logical product of control signal LCNT1 from signal generating circuit 9 and the output from NOT circuit 131 to the gate of switch SWL as control signal LCNT2.

Figure 7:
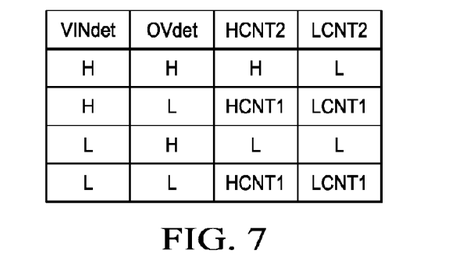
FIG. 7 is a figure for explaining the relationship between outputs VINdet and OVdet, and control signals HCNT2 and LCNT2, in the power supply device shown in FIG. 6.

Here, the relationship between outputs VINdet and OVdet and control signals HCNT2 and LCNT2 will be as shown in FIG. 7.

As shown in FIG. 7, when both outputs VINdet and OVdet are high level (H), that is, when both conditions that "voltage VBoost is higher than voltage OVREF" and "voltage (VIN+VOFFSET) is higher than voltage VBoost" are satisfied, control signal HCNT2 will be high level (H), and control signal LCNT2 will be low level (L). Thus, switch SWH will be on, and switch SWL will be off to switch forcibly to mode B.

On the other hand, as shown in FIG. 7, when "output VINdet is high level, and OVdet is low level," or when "output VINdet is low level, and OVdet is low level," control signals HCNT2 and LCNT2 will be the same as control signals HCNT1 and LCNT1, respectively.

Also as shown in FIG. 7, when "output VINdet is low level, and OVdet is high level," both control signals HCNT2 and LCNT2 will be low level.

Also with power supply device 101 shown in FIG. 7, the same functions as with power supply device 1 shown in FIG. 1 can be demonstrated.

The present invention is not limited to the abovementioned embodiments.

Namely, a person skilled in the art could make various changes, combinations, sub-combinations and substitutions for the component elements in the embodiments described above, within the technical scope of the present invention or within an equivalent scope.

In the embodiments described above, forcible transition to mode B occurs by turning switch SWH on, but it would also be possible to transition to mode B by providing a path to connect input side terminal 61 and output side terminal 71 apart from switch SWH and connecting that path.

Also with the embodiments described above, the conditions for forcible transition to mode B are determined based on the output from two comparators 11 and 13 that execute comparison relating to output voltage VBoost, but the present invention is not limited to this. For example, a comparator that compares a prescribed voltage (abovementioned OVREF, for example) specified according to the target voltage for output voltage VBoost and input voltage VIN could be provided to forcibly transition to mode B when input voltage VIN is higher than the prescribed voltage (OVREF) according to the comparator.

Also with the embodiments described above, the polarity of current flowing through switch SWH is determined by comparing the voltage at input terminal 67 and output voltage VBoost, but it could be determined with a method other than this.

Also, the logic circuits that are control circuit modules 5 and 105 are one example, and other configurations can also be used if they demonstrate the same functions.

Also with the embodiments described above, MOS transistors are provided as the switching elements, but other switching elements could be used.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an inductor that is coupled between an input node and a switching node;
   a first switch that is coupled between the switching node and ground;
   a second switch that is coupled between the switching node and an output node;
   a first comparator that is coupled to the output node;
   a signal generating circuit that is coupled to the first comparator;
   a first logic circuit that is coupled to the first switch and the signal generating circuit, wherein the first logic circuit actuates and deactuates the first switch;
   a second logic circuit that is coupled to the second switch and the signal generating circuit, wherein the second logic circuit actuates and deactuates the second switch, and wherein the second logic circuit includes:
      an AND gate that is coupled to the second comparator and the third comparator;
      a first NOR gate that is coupled to the third comparator and the signal generating circuit; and
      a second NOR gate that is coupled to the AND gate, the first NOR gate, and the second switch;
   a second comparator that is coupled to the output node, the input node, and the second logic circuit; and
   a third comparator that is coupled to the output node, the first logic circuit, and the second logic circuit.

2. The apparatus of claim 1, wherein the AND gate further comprises a first AND gate, and wherein the first logic circuit further comprises:
   an inverter that is coupled to the third comparator; and
   a second AND gate that is coupled to the inverter, the signal generating circuit, and the first switch.

3. The apparatus of claim 1, wherein the first switch further comprises an NMOS transistor.

4. The apparatus of claim 1, wherein the second switch further comprises a PMOS transistor.

5. An apparatus comprising:
   an inductor that is coupled between an input node and a switching node;
   an NMOS transistor that is coupled to the switching node at its drain and ground at its source;
   a PMOS transistor that is coupled to the switching node at its drain and an output node at its source;
   a first comparator that is coupled to the output node, wherein the first comparator compares the voltage on the output node to a first reference voltage;
   a signal generating circuit that is coupled to the first comparator;
   a first logic circuit that is coupled to the gate of the NMOS transistor and the signal generating circuit;
   a second logic circuit that is coupled to the gate of the PMOS transistor and the signal generating circuit, wherein the second logic circuit includes:
      an AND gate that is coupled to the second comparator and the third comparator;
      a first NOR gate that is coupled to the third comparator and the signal generating circuit; and
      a second NOR gate that is coupled to the AND gate, the first NOR gate, and the gate of the PMOS transistor;
   a second comparator that is coupled to the output node, the input node, and the second logic circuit; and
   a third comparator that is coupled to the output node, the first logic circuit, and the second logic circuit, wherein the third comparator compares the voltage on the output node to a second reference voltage.

6. The apparatus of claim 5, wherein the AND gate further comprises a first AND gate, and wherein the first logic circuit further comprises:
   an inverter that is coupled to the third comparator; and
   a second AND gate that is coupled to the inverter, the signal generating circuit, and the gate of the NMOS transistor.

7. An apparatus comprising:
   an inductor that is coupled between an input node and a switching node;
   an NMOS transistor that is coupled to the switching node at its drain and ground at its source;
   a PMOS transistor that is coupled to the switching node at its drain and an output node at its source;
   a first comparator that is coupled to the output node, wherein the first comparator compares the voltage on the output node to a first reference voltage;
   a signal generating circuit that is coupled to the first comparator;
   a second comparator that is coupled to the output node and the input node;
   a third comparator that is coupled to the output node, wherein the third comparator compares the voltage on the output node to a second reference voltage;
   an inverter that is coupled to the third comparator;
   an first AND gate that is coupled to the inverter, the signal generating circuit, and the gate of the NMOS transistor;
   an second AND gate that is coupled to the second comparator and the third comparator;
   a first NOR gate that is coupled to the third comparator and the signal generating circuit; and
   a second NOR gate that is coupled to the second AND gate, the first NOR gate, and the gate of the PMOS transistor.

* * * * *